US012589809B2

(12) United States Patent (10) Patent No.: US 12,589,809 B2
Jeon et al. (45) Date of Patent: Mar. 31, 2026

(54) SWING DOOR MOUNTING STRUCTURE FOR VEHICLE

(71) Applicants:Hyundai Motor Company, Seoul (KR); Kia Corporation, Seoul (KR)

(72) Inventors: Chan Woong Jeon, Incheon (KR); Youngrock Kim, Gwangmyeong-si (KR); Jaeseung Lee, Hwaseong-si (KR); Gookhyun Jeon, Seoul (KR); Chang Hak Kang, Hwaseong-si (KR); Sang Kyoung Han, Gunpo-si (KR); HaeHoon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 366 days.

(21) Appl. No.: 18/337,349

(22) Filed: Jun. 19, 2023

(65) Prior Publication Data

US 2024/0124066 A1      Apr. 18, 2024

(30) Foreign Application Priority Data

Oct. 13, 2022    (KR) ........................ 10-2022-0131197

(51) Int. Cl.
B62D 25/06          (2006.01)
B60J 5/04          (2006.01)
B62D 25/04          (2006.01)
E05D 15/34          (2006.01)
(52) U.S. Cl.
CPC ............. B62D 25/06 (2013.01); B60J 5/047 (2013.01); B62D 25/04 (2013.01); E05D 15/34 (2013.01); *E05Y 2600/45* (2013.01); *E05Y 2600/51* (2013.01); *E05Y 2600/62* (2013.01); *E05Y 2600/624* (2013.01); *E05Y 2900/531* (2013.01)

(58) Field of Classification Search
CPC ........ B62D 25/06; B62D 25/04; B62D 25/02; B62D 27/023; B60J 5/047; B60J 5/05; B60J 5/06; B60J 5/04; B60J 5/0477; B60J 5/0479; E05D 15/34; E05D 2700/00; E05D 2700/02; E05Y 2600/45; E05Y 2600/62; E05Y 2900/531
USPC ........ 296/146.11, 12, 210, 203.01, 2, 193.05
See application file for complete search history.

(56) References Cited

U.S. PATENT DOCUMENTS 4,560,197 A * 12/1985 Minami .............. E05D 15/0691
49/213
6,213,535 B1 * 4/2001 Landmesser ............... B60J 5/06
296/146.12
8,915,540 B2 * 12/2014 Nishimura ............. B62D 25/06
296/210

FOREIGN PATENT DOCUMENTS

KR        2004014701 A * 2/2004

OTHER PUBLICATIONS

KR2004014701 Text (Year: 2004).*

* cited by examiner

*Primary Examiner* — Dennis H Pedder
(74) *Attorney, Agent, or Firm* — Slater Matsil, LLP

(57) ABSTRACT

An embodiment swing door mounting structure for a vehicle includes a roof side reinforcement member coupled to an inner side of a cross section of a roof side of a side structure in a vehicle body front and rear direction and a door mounting member coupled to the roof side reinforcement member to define an open cross section for mounting a swing door on the roof side.

20 Claims, 12 Drawing Sheets

SWING DOOR MOUNTING STRUCTURE FOR VEHICLE

CROSS-REFERENCE TO RELATED APPLICATIONS

This application claims the benefit of Korean Patent Application No. 10-2022-0131197, filed on Oct. 13, 2022, which application is hereby incorporated herein by reference.

TECHNICAL FIELD

An embodiment of the present invention relates to a body of a vehicle.

BACKGROUND

Recently, the automobile industry has been introducing a new concept of future mobility vision for realizing a human-centered dynamic future city. One of these future mobility solutions is a purpose built vehicle (PBV).

An example of a PBV may be an electric vehicle (EV)-based eco-friendly mobile vehicle. PBVs may provide various customized services to users while moving from the ground to a destination in an unmanned autonomous driving method. PBVs may be configured in various forms according to types of customized services.

In an example, PBVs are manufactured in a one box design with a wide indoor space. Such PBVs have a double-door type swing door applied to a vehicle body in order to provide users with a wide getting on and off space.

The matters described in the background section are drafted to enhance the understanding of the background of embodiments of the invention and may include matters that are not already known to those of ordinary skill in the art to which this technology pertains.

SUMMARY

An embodiment of the present invention relates to a body of a vehicle. Particular embodiments relate to a swing door mounting structure for a purpose built vehicle (PBV).

Embodiments of the present disclosure provide a swing door mounting structure for a vehicle capable of securing door mounting rigidity and the rigidity of a vehicle body by installing a swing door.

According to an embodiment of the present invention, a swing door mounting structure for a vehicle in which at least one swing door is mounted on at least one side structure may include i) a roof side reinforcement member coupled to an inner side of a cross section of a roof side of the at least one side structure in a vehicle body front and rear direction and ii) a door mounting member coupled to the roof side reinforcement member to form an open cross section for mounting the at least one swing door on the roof side.

The roof side reinforcement member may be configured in a downwardly concave cross-section shape and coupled to a lower portion of a roof side upper member to form a center closed section in the vehicle body front and rear direction.

The door mounting member may be coupled to a lower portion of the roof side reinforcement member to form the open cross section of a '⊏' shape in a vehicle width direction and may be coupled to a roof side inner panel.

The swing door mounting structure for the vehicle may further include a center bulk head coupled to a center portion of the roof side reinforcement member.

The swing door mounting structure for the vehicle may further include a center roof rail extending to the inner side of the cross section of the roof side and coupled to the center bulk head in a vehicle width direction.

The swing door mounting structure for the vehicle may further include a pipe nut coupled to the roof side upper member and the roof side reinforcement member in an up and down direction in a center closed section between a roof side upper member and the roof side reinforcement member.

The swing door mounting structure for the vehicle may further include a fastening bolt fastened to the pipe nut and to which one or more link arms coupled to the at least one swing door are rotatably coupled.

The fastening bolt may be coupled to a roof side inner panel and the door mounting member through a head portion.

The one or more link arms may include a boss portion rotatably coupled to the fastening bolt between the roof side reinforcement member and the door mounting member.

A reinforcement plate may be coupled to the door mounting member to support a head portion of the fastening bolt.

The swing door mounting structure for the vehicle may further include a front side reinforcement member disposed in an inner side of a cross section of a front side of the at least one side structure and coupled to the roof side reinforcement member through a first gusset in the vehicle body front and rear direction.

A front closed section connected to a center closed section between a roof side upper member and the roof side reinforcement member may be formed between the front side upper member and the front side reinforcement member.

The swing door mounting structure for the vehicle may further include a first front roof rail extending to the inner side of the cross section of the front side and coupled to a second gusset formed on the front side reinforcement member in the vehicle width direction at a position corresponding to a front pillar of the front side and a second front roof rail extending to the inner side of the cross section of the front side and coupled to the first gusset in the vehicle width direction at a position corresponding to a first door support pillar of the front side.

The swing door mounting structure for the vehicle may further include a rear side reinforcement member disposed in an inner side of a cross section of a rear side of the at least one side structure and coupled to the roof side reinforcement member through a third gusset in the vehicle body front and rear direction.

A rear closed section connected to a center closed section between a roof side upper member and the roof side reinforcement member may be formed between a rear side upper member and the rear side reinforcement member.

The swing door mounting structure for the vehicle may further include a first rear roof rail extending to the inner side of the cross section of the rear side and coupled to a fourth gusset formed in the rear side reinforcement member in the vehicle width direction at a position corresponding to a rear pillar of the rear side and a second rear roof rail extending to the inner side of the cross section of the rear side and coupled to the third gusset in the vehicle width direction at a position corresponding to a second door support pillar of the rear side.

Embodiments of the present invention may improve the connectivity, rigidity, durability, shock absorption, and NVH performance of the vehicle body configured in a one-box design while securing the mounting rigidity of the swing door.

In addition, the effects obtainable or predicted by the embodiments of the present invention are to be disclosed directly or implicitly in the detailed description of the embodiments of the present invention. That is, various effects predicted according to embodiments of the present invention will be disclosed in the detailed description to be described later.

BRIEF DESCRIPTION OF THE DRAWINGS

Because these drawings are for reference in explaining the embodiments of the present invention, the technical idea of the present invention should not be construed as being limited to the accompanying drawings.

FIGS. 2 and 3 are partially exploded perspective views illustrating a swing door mounting structure for a vehicle according to an embodiment of the present invention.

Figure 1:
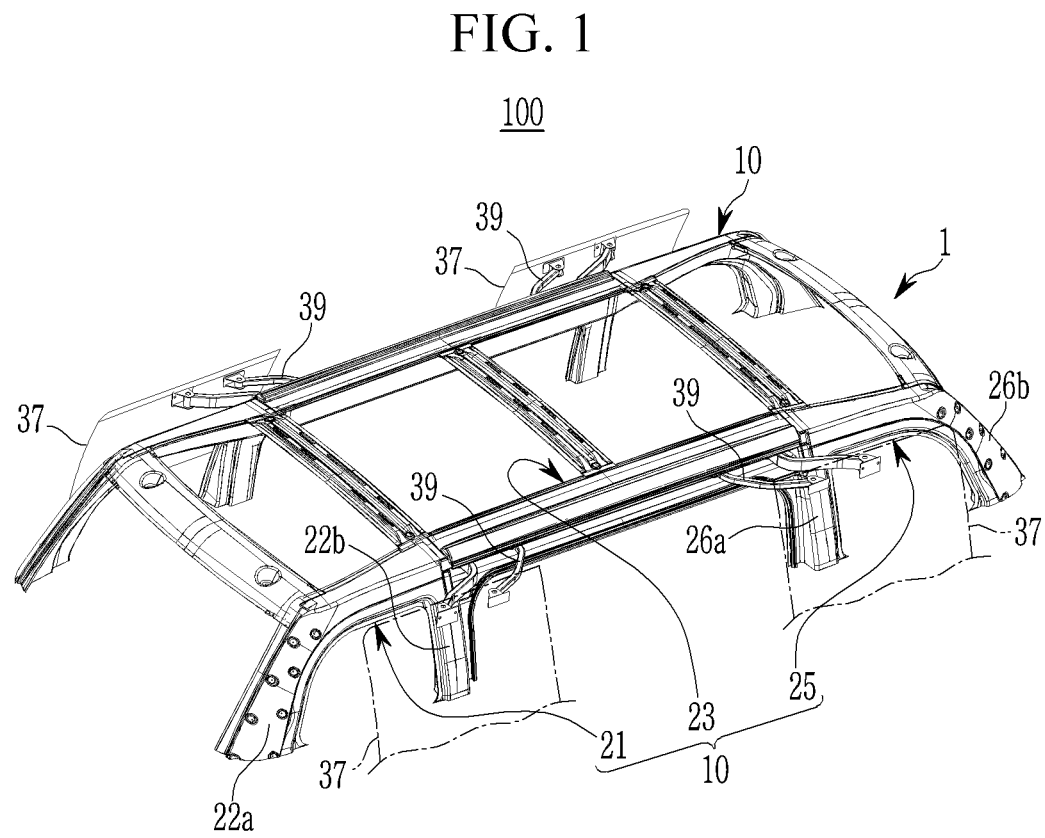
FIG. 1 is a combined perspective view illustrating a swing door mounting structure for a vehicle according to an embodiment of the present invention.

It should be understood that the drawings referenced above are not necessarily drawn to scale, but present a rather simplified representation of various preferred features illustrating the basic principles of embodiments of the present invention. Specific design features of embodiments of the present invention including, for example, specific sizes, directions, positions, and shapes are determined in part according to specifically intended applications and environments of use.

The following reference identifiers may be used in connection with the figures to describe exemplary embodiments of the present invention.

| | | | |
|---|---|---|---|
| 1: | upper body | 10: | side structure |
| 11: | side inner panel assembly | 13: | side outer panel assembly |
| 15: | outer reinforcement panel portion | 17: | outer panel portion |
| 21: | front side | 22a: | front pillar |
| 22b: | first door support pillar | 23: | roof side |
| 25: | rear side | 26a: | second door support pillar |
| 26b: | rear pillar | 27: | front side upper member |
| 29: | roof side upper member | 31: | roof side outer panel |
| 33: | rear side upper member | 35: | roof side inner panel |
| 37: | swing door | 39: | link arm |
| 40: | roof side reinforcement member | 41: | forming portion |
| 43: | center closed section | 50: | door mounting member |

-continued

| | | | |
|---|---|---|---|
| 51: | open cross section | 60: | pipe nut |
| 65: | fastening bolt | 66: | head portion |
| 68: | boss portion | 69: | reinforcement plate |
| 70: | center bulk head | 73: | center roof rail |
| 76: | front side reinforcement member | 76a: | second gusset |
| 77: | first gusset | 78: | front closed section |
| 79: | first front roof rail | 83: | second front roof rail |
| 86: | rear side reinforcement member | 86a: | fourth gusset |
| 87: | third gusset | 88: | rear closed section |
| 89: | first rear roof rail | 93: | second rear roof rail |
| 100: | swing door mounting structure for vehicle | | |

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. However, the present invention may be implemented in many different forms and is not limited to the embodiments described herein.

The terms used herein are for the purpose of describing specific embodiments only and are not intended to limit the present disclosure. As used herein, singular forms are intended to also include plural forms unless the context clearly indicates otherwise.

It will also be understood that the terms "comprises" and/or "comprising," when used herein, specify the presence of mentioned features, integers, steps, actions, elements and/or components, but do not exclude the presence or addition of one or more other features, integers, steps, actions, elements, components, and/or groups thereof.

As used herein, the term "and/or" includes any one or all combinations of the associated listed items.

In the specification, the term 'coupled' indicates the physical relationship between two components directly connected to each other by welding, self piercing rivet (SPR), flow drill screw (FDS), structural adhesive, etc. or indirectly connected to each other through one or more intermediate components.

The terms "vehicle," "of a vehicle," "automobile", or other similar terms used herein generally may include passenger vehicles including passenger vehicles, sport utility vehicles (SUVs), buses, trucks, and various commercial vehicles, and may include hybrid vehicles, electric vehicles, hybrid electric vehicles, electric vehicle-based purpose built vehicles (PBVs), hydrogen power vehicles, and other alternative fuel vehicles (e.g., fuels derived from resources other than petroleum).

Hereinafter, with reference to the accompanying drawings, embodiments of the present invention will be described in detail.

Figure 2:
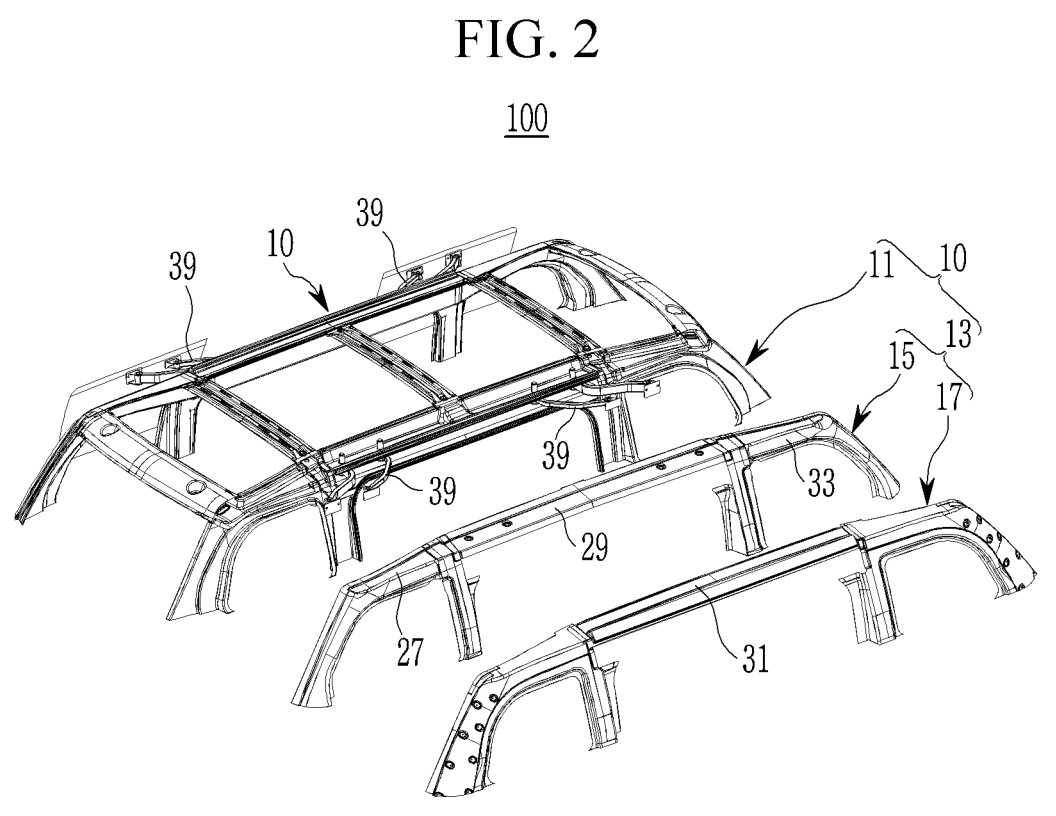
Figure 3:
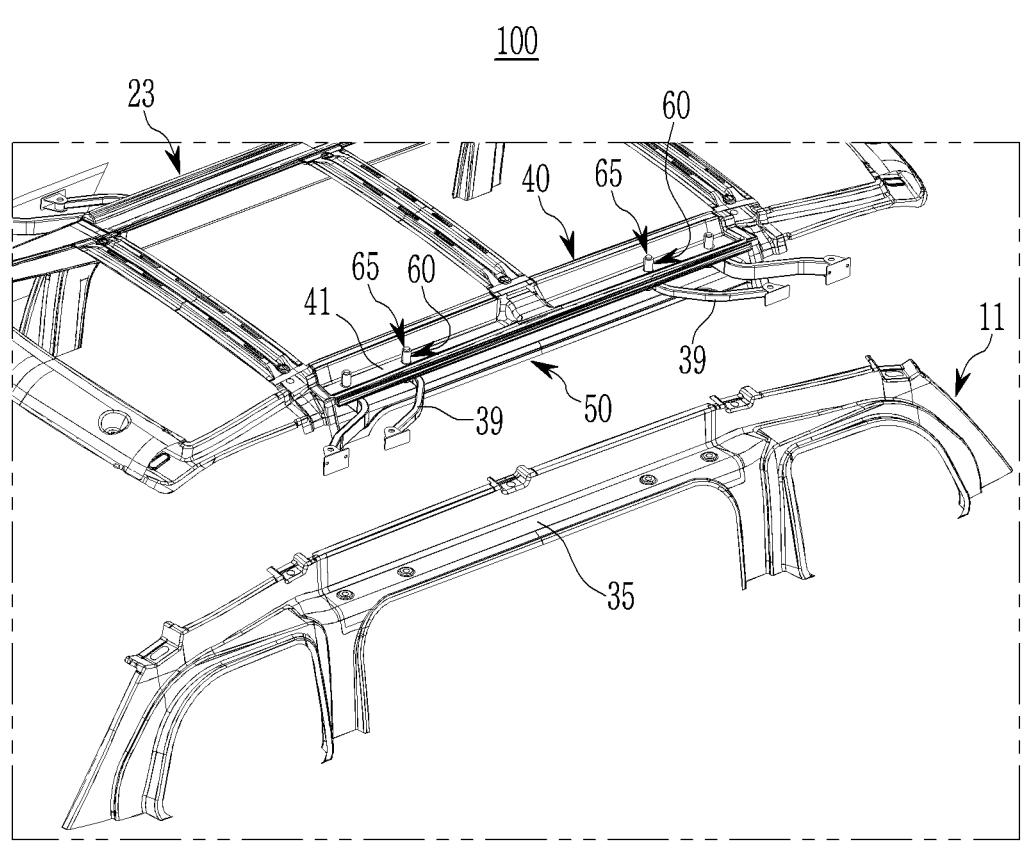

FIG. 1 is a combined perspective view illustrating a swing door mounting structure for a vehicle according to an embodiment of the present invention. FIGS. 2 and 3 are partially exploded perspective views illustrating a swing door mounting structure for a vehicle according to an embodiment of the present invention.

Referring to FIGS. 1 to 3, a swing door mounting structure wo for a vehicle according to an embodiment of the present invention may be applied to a body of, for example, a purpose built vehicle (hereinafter, referred to as a 'PBV').

In an example, the PBV may be used as an electric vehicle-based life module vehicle that provides various services to passengers while moving from the ground to a destination in an unmanned autonomous driving method. The life module vehicle described above is also commonly referred to as a 'robo taxi', a 'robo shuttle', or a 'hailing vehicle' by those skilled in the art.

Such a PBV may be manufactured in a one box design with a wide indoor space. In addition, the PBV may apply a facing type seat to provide the wide indoor space.

The body of the PBV includes a skate board type under body (not shown) (commonly referred to as a 'rolling chassis' or a 'chassis frame' by those skilled in the art) and an upper body 1 assembled to the under body.

A battery assembly (not shown) and a driving motor (not shown) may be mounted on the under body. In addition, the upper body 1 is a body-in-white (BIW) body coupled to the under body and may constitute a cabin with a wide indoor space.

In the specification, reference directions for describing the following components may be set as a vehicle body front and rear direction (e.g., a vehicle body longitudinal direction or longitudinal direction), a vehicle width direction (e.g., a lateral direction or a left and right direction), and an up and down direction (e.g., a height direction) with respect to the vehicle body.

In addition, in the specification, the term 'upper end portion', 'upper portion', 'upper end', or 'upper portion surface' of a component indicates an end portion, a portion, an end, or a surface of a component located on a relatively upper side in the drawing, and the term 'lower end portion', 'lower portion', 'lower end', or 'lower portion surface' of a component indicates an end portion, a portion, an end, or a surface of a component located on a relatively lower side in the drawing.

Furthermore, in the specification, an end (e.g., one end, another end, or both ends, etc.) of a component indicates an end of the component in any one direction, and an end portion (e.g., one end portion, the other end portion, both end portions, front end portion, or rear end portion, etc.) of a component indicates a certain part of the component including its tip.

On the other hand, the upper body 1 as described above includes side structures 10 respectively provided on both sides in the vehicle width direction.

In an embodiment of the present invention, the side structures 10 on both sides in the vehicle width direction include a side inner panel assembly ii and a side outer panel assembly 13.

The side inner panel assembly ii and the side outer panel assembly 13 may be coupled in the vehicle width direction and may be configured as a side complete assembled to the under body.

Here, the side outer panel assembly 13 includes an outer reinforcement panel portion 15 coupled to the side inner panel assembly ii and an outer panel portion 17 coupled to the outer reinforcement panel portion 15.

Furthermore, the side structures 10 on both sides in the vehicle width direction include a front side 21, a roof side 23, and a rear side 25 in the vehicle body front and rear direction (see FIG. 1).

The front side 21 includes a front pillar 22a and a first door support pillar 22b. The rear side 25 includes a second door support pillar 26a and a rear pillar 26b.

Also, the roof side 23 is coupled to upper portions of the first door support pillar 22b and the second door support pillar 26a in the vehicle body front and rear direction.

Furthermore, the front side 21 includes a front side upper member 27 provided on the outer reinforcement panel portion 15.

The roof side 23 includes a roof side upper member 29 provided in the outer reinforcement panel portion 15 and a roof side outer panel 31 provided on the outer panel portion 17 so as to be coupled to the upper portion of the roof side upper member 29.

The rear side 25 includes a rear side upper member 33 provided in the outer reinforcement panel portion 15.

Also, the side inner panel assembly ii includes a roof side inner panel 35.

On the other hand, at least one swing door 37 may be mounted on the at least one side structure 10. The at least one swing door 37 may be swing rotatably mounted on upper and lower portions of the at least one side structure 10 in the vehicle body front and rear direction.

However, in the specification, an example in which the at least one swing door 37 is swing rotatably mounted on the upper portion of the at least one side structure 10 will be described.

In an example, a pair of the swing doors 37 may be provided on the at least one side structure 10. As described above, the pair of the swing doors 37 provided on the at least one side structure 10 may be configured as swing rotatable double-door type swing doors in a direction farther from or closer to each other in the vehicle body front and rear direction.

Furthermore, the at least one swing door 37 may be mounted on the at least one side structure 10 to be swingable through one or more link arms 39. The one or more link arms 39 may be coupled to the at least one swing door 37 and rotatably coupled to the at least one side structure 10 in a cantilever form.

The swing door mounting structure 100 for the vehicle according to an embodiment of the present invention has a structure capable of securing the door mounting rigidity of the upper portion of the at least one side structure 10 and the overall rigidity of the upper body 1 by mounting the at least one swing door 37 on the at least one side structure 10.

Figure 4:
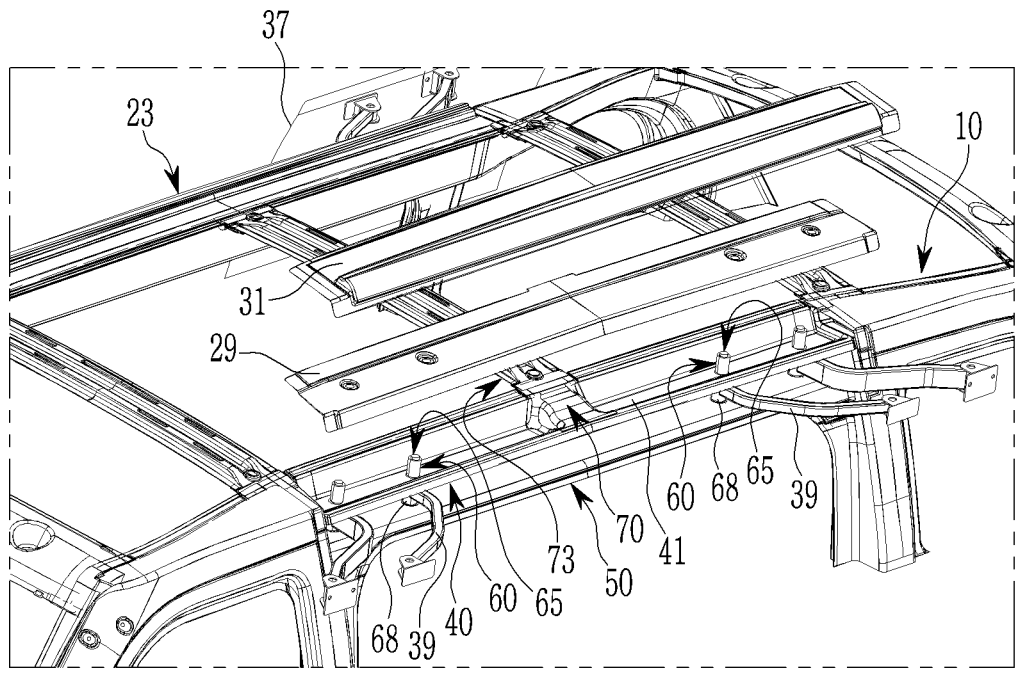
FIG. 4 is a partially exploded perspective view illustrating a coupling structure of a roof side reinforcement member and a door mounting member applied to a swing door mounting structure for a vehicle according to an embodiment of the present invention.
Figure 5:
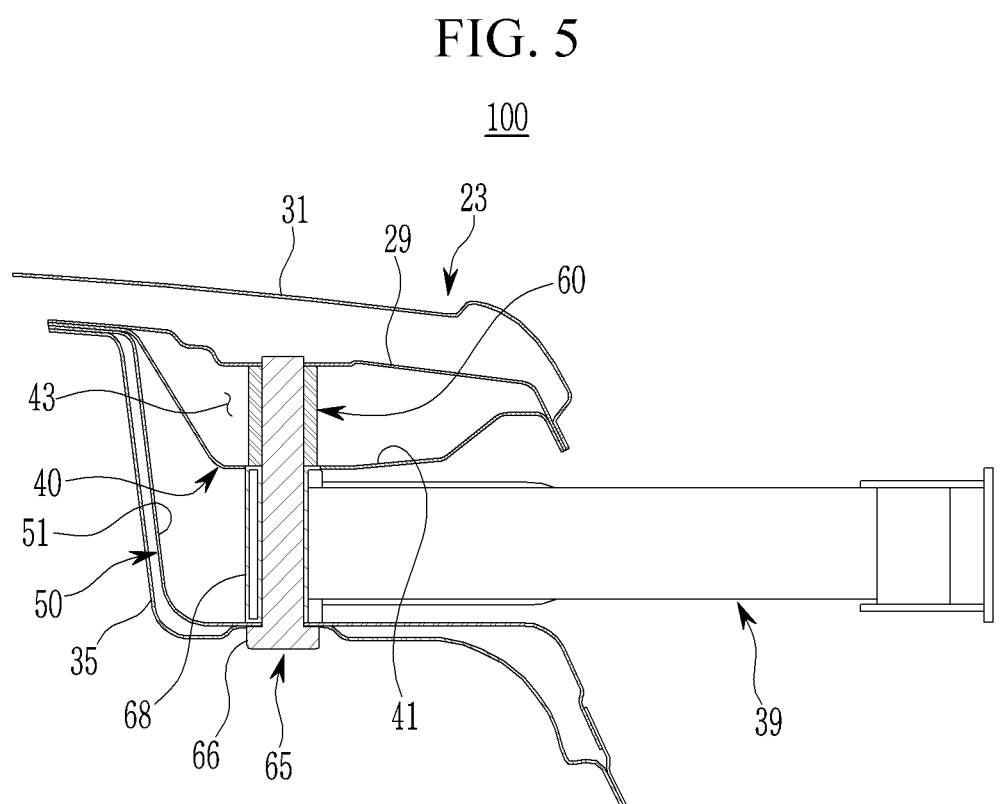
FIG. 5 is a cross-sectional view illustrating a coupling structure of a roof side reinforcement member and a door mounting member applied to a swing door mounting structure for a vehicle according to an embodiment of the present invention.

FIG. 4 is a partially exploded perspective view illustrating a coupling structure of a roof side reinforcement member and a door mounting member applied to a swing door mounting structure for a vehicle according to an embodiment of the present invention. FIG. 5 is a cross-sectional view illustrating a coupling structure of a roof side reinforcement member and a door mounting member applied to a swing door mounting structure for a vehicle according to an embodiment of the present invention.

Referring to FIGS. 3 to 5, the swing door mounting structure 100 for the vehicle according to an embodiment of the present invention basically includes a roof side reinforcement member 40, a door mounting member 50, a pipe nut 60, and a fastening bolt 65.

In an embodiment of the present invention, the roof side reinforcement member 40 is configured to reinforce the rigidity of the roof side 23 together with the roof side upper member 29 mentioned above.

The roof side reinforcement member 40 is coupled to the inner side of the cross section of the roof side 23 in the vehicle body front and rear direction.

The roof side reinforcement member 40 may be configured in a downwardly concave cross-section shape. The roof side reinforcement member 40 includes a forming portion 41 formed concave downward in the vehicle body front and rear direction.

Such a roof side reinforcement member 40 may be coupled to a lower portion of the roof side upper member 29 by welding to form a center closed section 43 in the vehicle body front and rear direction.

In an embodiment of the present invention, the door mounting member 50 is configured to reinforce the rigidity of the roof side 23 together with the roof side reinforcement member 40. In addition, the door mounting member 50 is configured to mount the at least one swing door 37 (hereinafter see FIG. 1).

Furthermore, the door mounting member 50 is configured to secure a swing rotational trajectory of the at least one swing door 37 by the one or more link arms 39.

Furthermore, the door mounting member 50 is configured to form an open cross section 51 for mounting the at least one swing door 37 as well as securing the swing rotational trajectory of the at least one swing door 37.

In an example, the door mounting member 50 is configured in a cross section shape of approximately 'L' and is coupled to the lower portion of the roof side reinforcement member 40.

Here, the door mounting member 50 may be coupled to the lower portion of the roof side reinforcement member 40 by welding to form the open cross section 51 of a '⊏' shape in the vehicle width direction. Also, the door mounting member 50 may be coupled to the roof side inner panel 35 mentioned above by welding.

In an embodiment of the present invention, the pipe nut 60 is configured to swing rotatably mount the one or more link arms 39 on the open cross section 51.

In addition, the pipe nut 60 is configured to support a load (e.g., a moment load) acting on the one or more link arms 39 by the load of the at least one swing door 37.

The pipe nut 60 is disposed in the center closed section 43 between the roof side upper member 29 and the roof side reinforcement member 40. The pipe nut 60 is coupled to the roof side upper member 29 and the roof side reinforcement member 40 in the up and down direction.

Such a pipe nut 60 forms a hollow with open upper and lower ends. The upper end of the pipe nut 60 may be coupled to the lower portion of the roof side upper member 29 by welding. Also, the lower end of the pipe nut 60 may be coupled to the upper portion of the roof side reinforcement member 40 by welding.

In an embodiment of the present invention, as shown in FIGS. 4 and 5, the fastening bolt 65 is configured to mount the one or more link arms 39. The fastening bolt 65 is fastened to the pipe nut 60 in the up and down direction.

Figure 6:
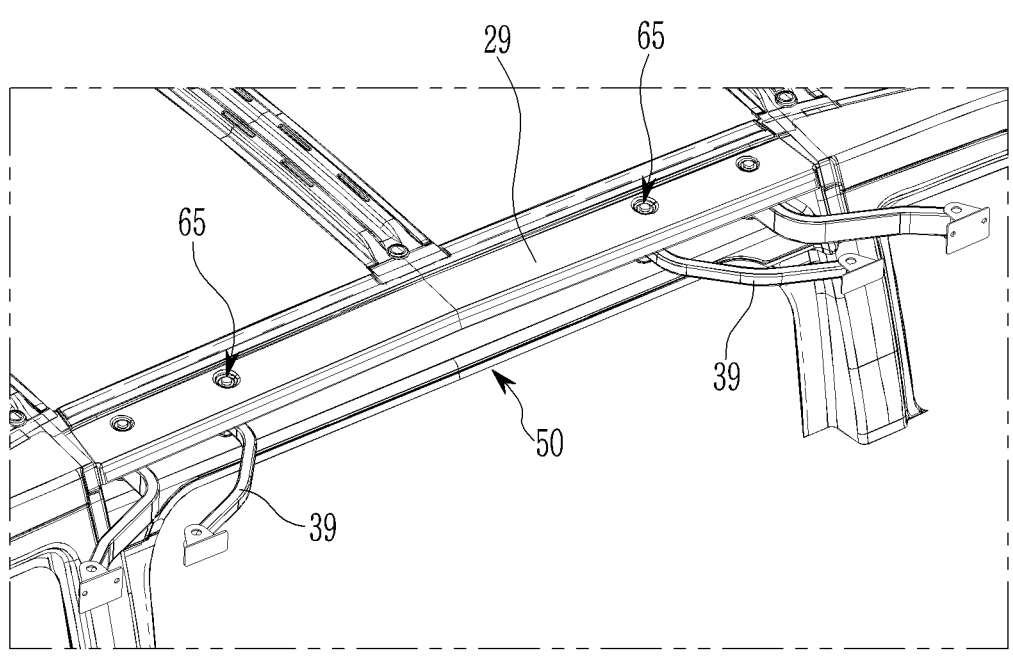
FIGS. 6 to 8 are diagrams illustrating link arm mounting structures applied to a swing door mounting structure for a vehicle according to an embodiment of the present invention.
Figure 7:
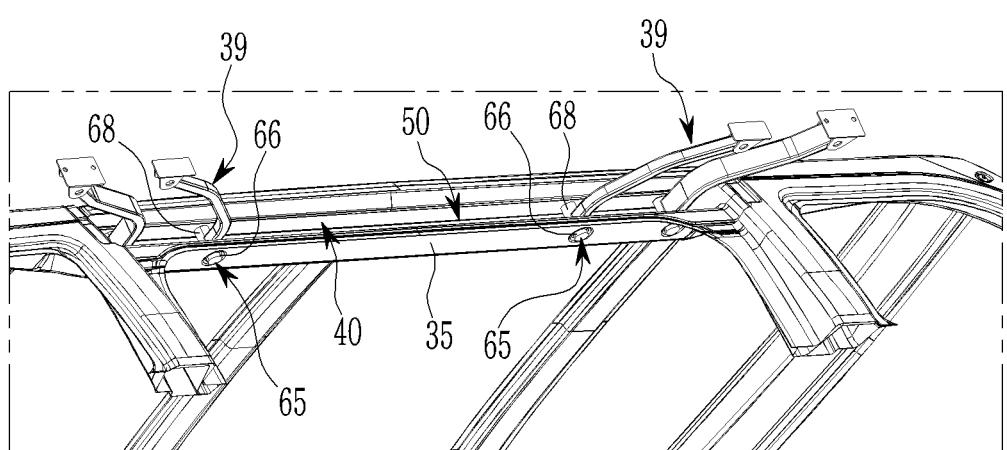

As shown in FIGS. 5 to 7, the one or more link arms 39 may be swing rotatably coupled to the fastening bolt 65.

Here, the fastening bolt 65 may be coupled to the roof side inner panel 35 and the door mounting member 50 through a head portion 66 and may be fastened to the pipe nut 60, as shown in FIGS. 4 to 7.

As the fastening bolt 65 is coupled to the roof side inner panel 35 and the door mounting member 50, the load acting on the lower portion of the fastening bolt 65 may be easily dispersed in the vehicle body front and rear direction, the vehicle width direction, and the up and down direction through the roof side inner panel 35 and the door mounting member 50.

Furthermore, the one or more link arms 39 as described above may be swing rotatably coupled to the fastening bolt 65 between the roof side reinforcement member 40 and the door mounting member 50. To this end, the one or more link arms 39 include a boss portion 68 rotatably coupled to the fastening bolt 65.

Figure 8:
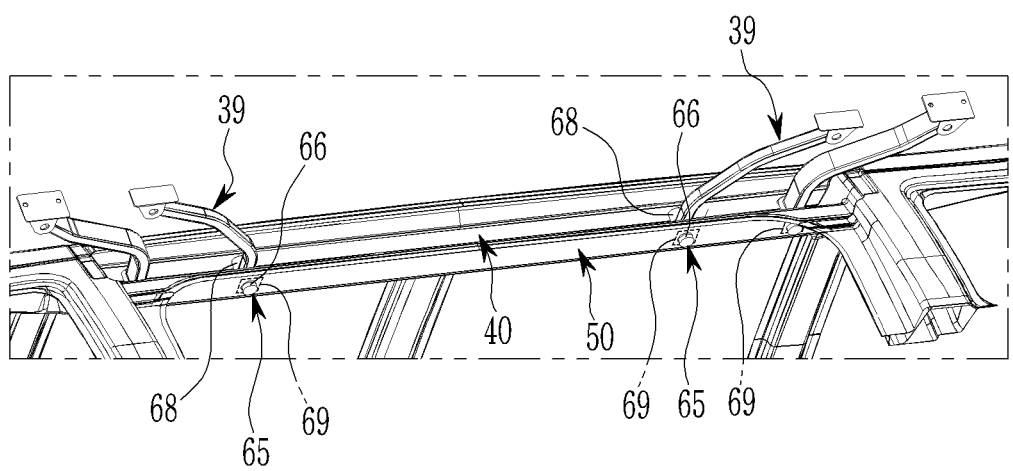

Furthermore, as shown in FIG. 8, a reinforcement plate 69 may be coupled to the lower portion of the door mounting member 50. The reinforcement plate 69 may support the head portion 66 of the fastening bolt 65 and reinforce the rigidity of the door mounting member 50.

Meanwhile, referring to FIG. 4, the swing door mounting structure 100 for the vehicle according to an embodiment of the present invention further includes a center bulk head 70 and a center roof rail 73.

In an embodiment of the present invention, the center bulk head 70 is configured to reinforce the rigidity of the roof side reinforcement member 40 and reinforce the mounting rigidity of the at least one swing door 37.

The center bulk head 70 is coupled to a center portion of the roof side reinforcement member 40. The center bulk head 70 may be coupled to the forming portion 41 and an edge portion of the roof side reinforcement member 40 by welding.

In an example, the center bulk head 70 may be provided in an upwardly convex shape on the edge portion to form a closed cross section coupled with the roof side reinforcement member 40.

In an embodiment of the present invention, the center roof rail 73 is configured to easily disperse the load acting on the upper portion of the fastening bolt 65 in the vehicle body front and rear direction, the vehicle width direction, and the up and down direction together with the center bulk head 70.

The center roof rail 73 is coupled to the center bulk head 70 in the vehicle width direction. The center roof rail 73 may extend to the inner side of the cross section of the roof side 23 and be joined to the center bulk head 70 by welding. In an example, the center roof rail 73 may be provided in a closed cross section shape in which an upper panel and a lower panel are joined in the up and down direction.

Figure 9:
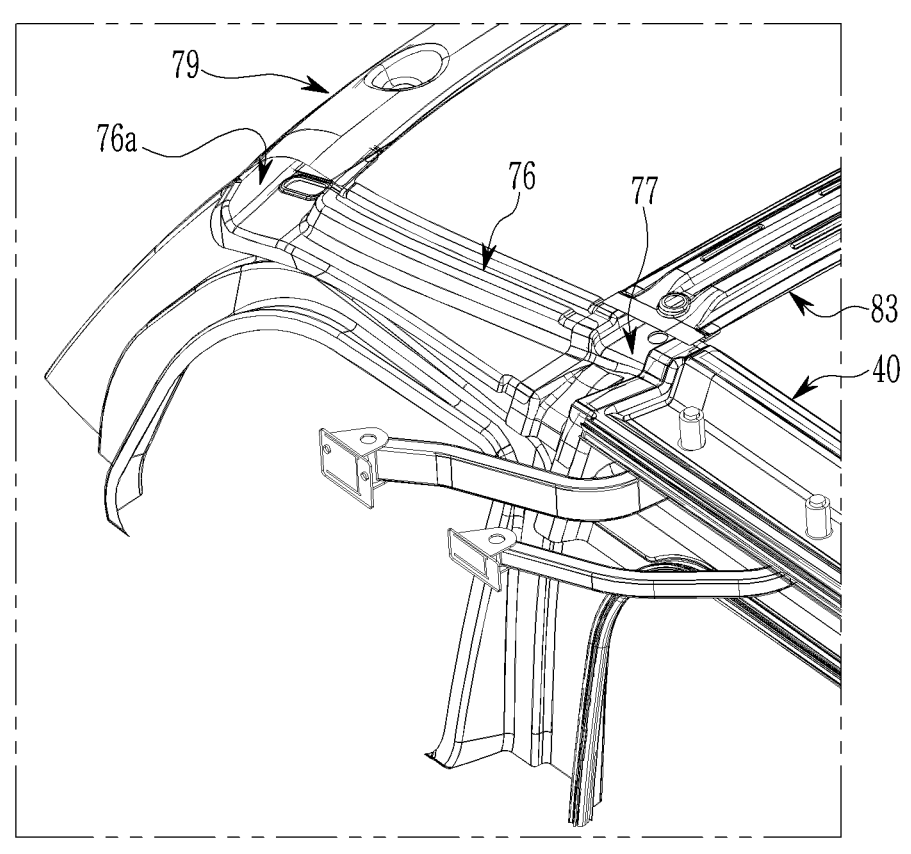
FIGS. 9 and 10 are diagrams illustrating a portion of a front side reinforcement member applied to a swing door mounting structure for a vehicle according to an embodiment of the present invention.
Figure 10:
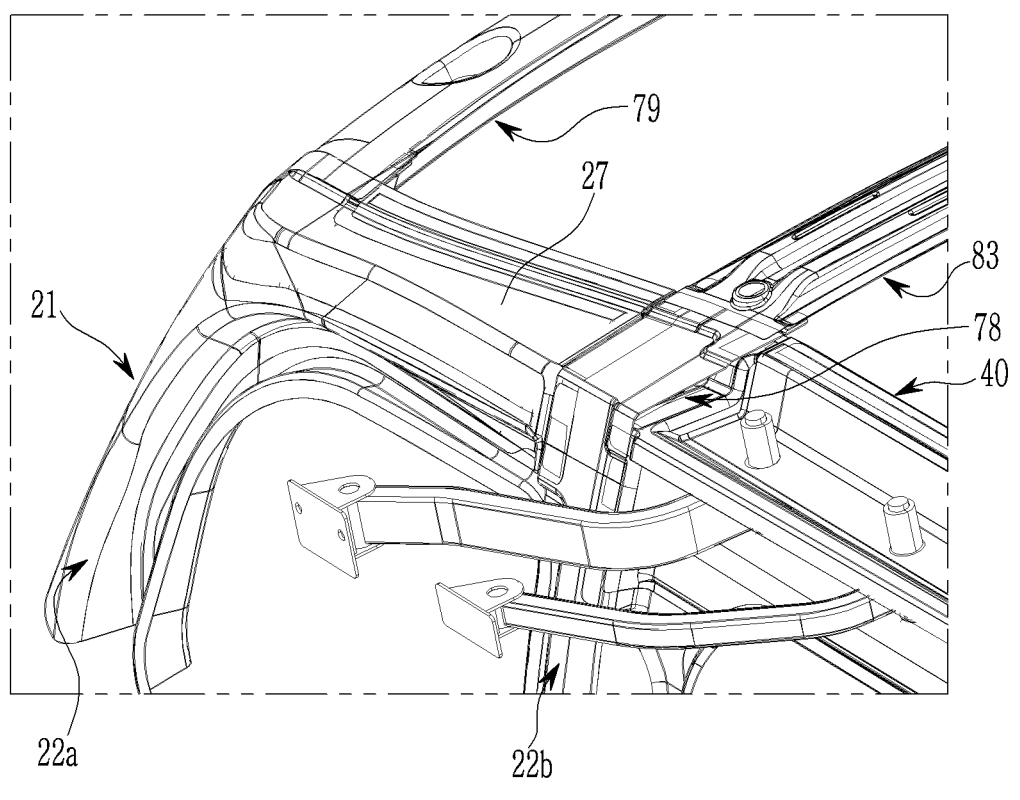

FIGS. 9 and 10 are diagrams illustrating a portion of a front side reinforcement member applied to a swing door mounting structure for a vehicle according to an embodiment of the present invention.

Referring to FIGS. 9 and 10 together with FIG. 5, the swing door mounting structure 100 for the vehicle according to an embodiment of the present invention further includes a front side reinforcement member 76, a first front roof rail 79, and a second front roof rail 83.

In an embodiment of the present invention, the front side reinforcement member 76 is configured to secure the rigidity of a front portion of the upper body 1 (hereinafter, see FIG. 1) by mounting the at least one swing door 37 on the at least one side structure 10 (hereinafter, see FIG. 1).

The front side reinforcement member 76 is disposed in the inner side of the cross section of the front side 21 of the at least one side structure 10. The front side reinforcement member 76 may be coupled to the inner side of the front side 21 by welding and may be coupled to the front side upper member 27 mentioned above by welding.

The front side reinforcement member 76 is coupled to the front portion of the roof side reinforcement member 40 by welding through a first gusset 77 in the vehicle body front and rear direction.

As the front side reinforcement member 76 is coupled to the front side upper member 27, a front closed section 78 may be formed between the front side upper member 27 and the front side reinforcement member 76.

The front closed section 78 is connected to the center closed section 43 between the roof side upper member 29 and the roof side reinforcement member 40 in the vehicle body front and rear direction.

In an embodiment of the present invention, the first front roof rail 79 is configured to secure the rigidity of the front portion of the upper body 1 together with the front side reinforcement member 76.

The first front roof rail 79 is coupled to a second gusset 76a formed in a front portion of the front side reinforcement member 76 in the vehicle width direction at a position corresponding to the front pillar 22a of the front side 21.

The first front roof rail 79 may extend to the inner side of the cross section of the front side 21 and be coupled to the second gusset 76a by welding. In an example, the first front roof rail 79 may be provided in a closed cross section shape in which an upper panel and a lower panel are joined in the up and down direction.

In an embodiment of the present invention, the second front roof rail 83 is configured to secure the rigidity of the front portion of the upper body 1 together with the front side reinforcement member 76.

The second front roof rail 83 is coupled to the first gusset 77 in the vehicle width direction at a position corresponding to the first door support pillar 22b of the front side 21.

The second front roof rail 83 may extend to the inner side of the cross section of the front side 21 and be coupled to the first gusset 77 by welding. In an example, the second front roof rail 83 may be provided in a closed cross section shape in which an upper panel and a lower panel are joined in the up and down direction.

Figure 11:
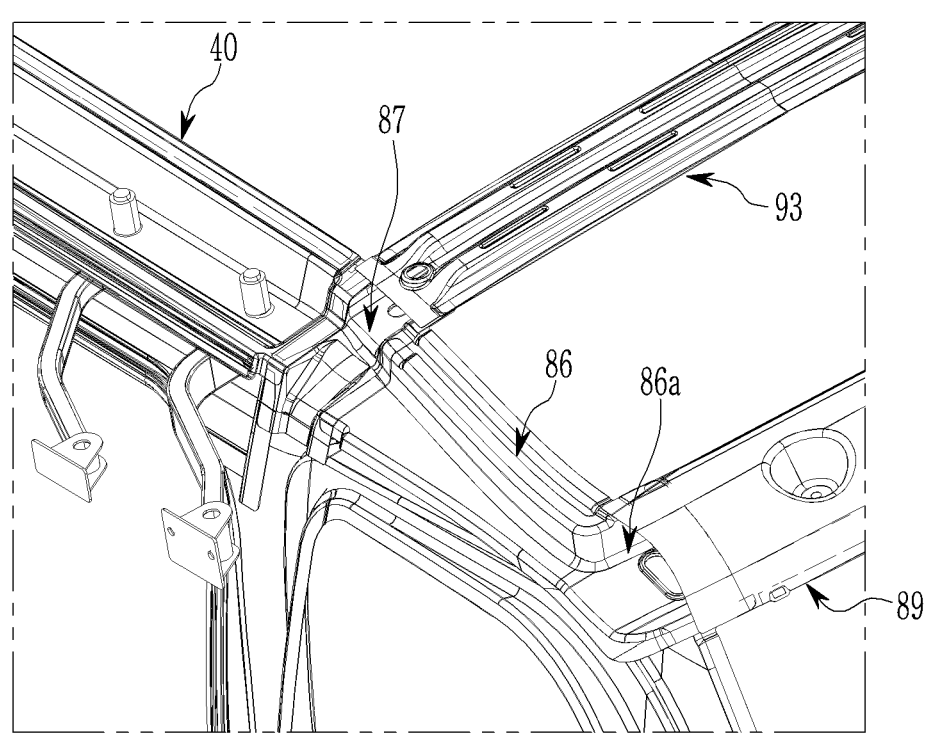
FIGS. 11 and 12 are diagrams illustrating a portion of a rear side reinforcement member applied to a swing door mounting structure for a vehicle according to an embodiment of the present invention.
Figure 12:
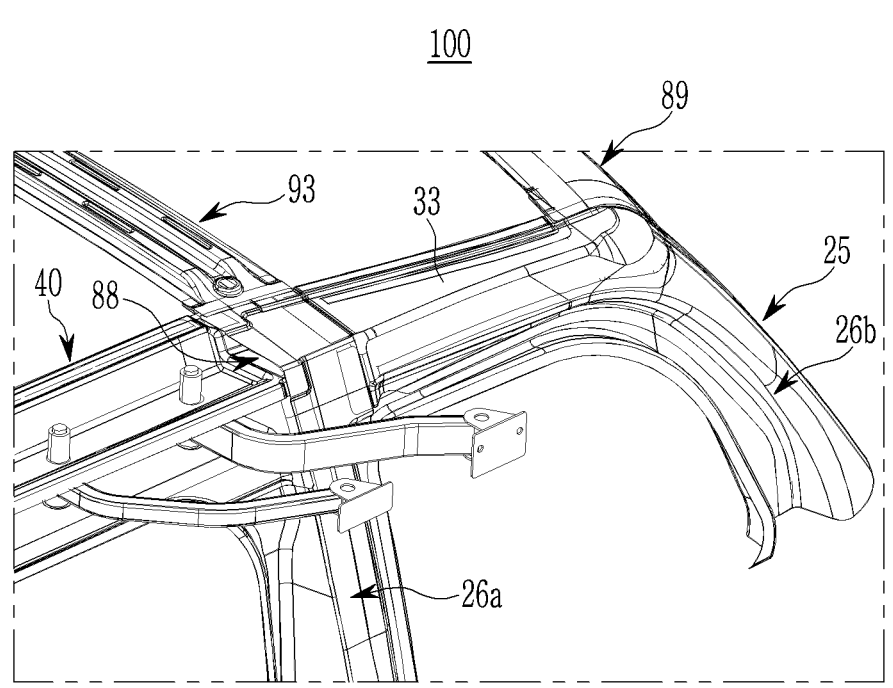

FIGS. 11 and 12 are diagrams illustrating a portion of a rear side reinforcement member applied to a swing door mounting structure for a vehicle according to an embodiment of the present invention.

Referring to FIGS. 11 and 12 together with FIG. 5, the swing door mounting structure 100 for the vehicle according to an embodiment of the present invention further includes a rear side reinforcement member 86, a first rear roof rail 89, and a second rear roof rail 93.

In an embodiment of the present invention, the rear side reinforcement member 86 is configured to secure the rigidity of a rear portion of the upper body 1 by mounting the at least one swing door 37 on the at least one side structure 10.

The rear side reinforcement member 86 is disposed in the inner side of the cross section of the rear side 25 of the at least one side structure 10. The rear side reinforcement member 86 may be coupled to the inner side of the rear side 25 by welding and may be coupled to the rear side upper member 33 mentioned above by welding.

The rear side reinforcement member 86 is coupled to the rear portion of the roof side reinforcement member 40 by welding through a third gusset 87 in the vehicle body front and rear direction.

As the rear side reinforcement member 86 is coupled to the rear side upper member 33, a rear closed section 88 may be formed between the rear side upper member 33 and the rear side reinforcement member 86.

The rear closed section 88 is connected to the center closed section 43 between the roof side upper member 29 and the roof side reinforcement member 40 in the vehicle body front and rear direction.

In an embodiment of the present invention, the first rear roof rail 89 is configured to secure the rigidity of the rear portion of the upper body 1 together with the rear side reinforcement member 86.

The first rear roof rail 89 is coupled to a fourth gusset 86a formed in a rear portion of the rear side reinforcement member 86 in the vehicle width direction at a position corresponding to the rear pillar 26b of the rear side 25.

The first rear roof rail 89 may extend to the inner side of the cross section of the rear side 25 and be coupled to the fourth gusset 86a by welding. In an example, the first rear roof rail 89 may be provided in a closed cross section shape in which an upper panel and a lower panel are joined in the up and down direction.

In an embodiment of the present invention, the second rear roof rail 93 is configured to secure the rigidity of the rear portion of the upper body 1 together with the rear side reinforcement member 86.

The second rear roof rail 93 is coupled to the third gusset 87 in the vehicle width direction at a position corresponding to the second door support pillar 26a of the rear side 25.

The second rear roof rail 93 may extend to the inner side of the cross section of the rear side 25 and be coupled to the third gusset 87 by welding. In an example, the second rear roof rail 93 may be provided in a closed cross section shape in which an upper panel and a lower panel are joined in the up and down direction.

Hereinafter, the operation of the swing door mounting structure 100 for the vehicle according to an embodiment of the present invention configured as above will be described in detail with reference to FIGS. 1 to 12.

First, in an embodiment of the present invention, the roof side reinforcement member 40 is coupled to the inner side of the cross section of the roof side 23. Also, the roof side reinforcement member 40 is coupled to the lower portion of the roof side upper member 29. Here, the center closed section 43 is formed between the roof side upper member 29 and the roof side reinforcement member 40 coupled to each other.

In an embodiment of the present invention, the door mounting member 50 is coupled to the roof side inner panel 35 and is coupled to the lower portion of the roof side reinforcement member 40. Here, the door mounting member 50 and the roof side reinforcement member 40 coupled to each other are formed in the open cross section 51 of a '⊏' shape.

In an embodiment of the present invention, the pipe nut 60 is coupled to the roof side upper member 29 and the roof side reinforcement member 40 in the up and down direction in the center closed section 43 between the roof side upper member 29 and the roof side reinforcement member 40.

In an embodiment of the present invention, the fastening bolt 65 is coupled to the roof side inner panel 35 and the door mounting member 50 in a direction from the lower side to the upper side and is fastened to the pipe nut 60.

Also, in an embodiment of the present invention, the one or more link arms 39 are swing rotatably coupled to the fastening bolt 65 through the boss portion 68 in a region of the open cross section 51.

Therefore, the roof side reinforcement member 40, the door mounting member 50, and the pipe nut 60 as described above may support the moment load acting on the fastening bolt 65 through the one or more link arms 39 by the load of the at least one swing door 37.

Thus, the swing door mounting structure 100 for the vehicle according to an embodiment of the present invention disperses the load acting on the lower portion of the fastening bolt 65 in the vehicle body front and rear direction, the vehicle width direction, and the up and down direction, thereby securing the mounting rigidity of the one or more swing doors 37.

Meanwhile, in an embodiment of the present invention, the center bulk head 70 is coupled to the center portion of the roof side reinforcement member 40.

Also, in an embodiment of the present invention, the center roof rail 73 extends to the inner side of the cross section of the roof side 23 and is coupled to the center bulk head 70.

Therefore, the center bulk head 70 and the center roof rail 73 as above may easily disperse the load acting on the upper portion of the fastening bolt 65 in the vehicle body front and rear direction, the vehicle width direction, and the up and down direction.

Thus, the swing door mounting structure 100 for the vehicle according to an embodiment of the present invention may secure the rigidity of the roof side reinforcement member 40 and the mounting rigidity of the at least one swing door 37 through the center bulk head 70 and the center roof rail 73.

On the other hand, in an embodiment of the present invention, the front side reinforcement member 76 is coupled to the inner side of the cross section of the front side 21.

In an embodiment of the present invention, the first front roof rail 79 and the second front roof rail 83 extend to the inner side of the cross section of the front side 21 and are coupled to the front side reinforcement member 76.

In an embodiment of the present invention, the rear side reinforcement member 86 is coupled to the inner side of the cross section of the rear side 25.

Furthermore, in an embodiment of the present invention, the first rear roof rail 89 and the second rear roof rail 93 extend to the inner side of the cross section of the rear side 25 and are coupled to the rear side reinforcement member 86.

Here, the front closed section 78 is formed between the front side reinforcement member 76 and the front side upper member 27. Also, the rear closed section 88 is formed between the rear side reinforcement member 86 and the rear side upper member 33.

The front closed section 78 and the rear closed section 88 are connected to the center closed section 43 between the roof side upper member 29 and the roof side reinforcement member 40 coupled to each other in the vehicle body front and rear direction. That is, the front closed section 78, the center closed section 43, and the rear closed section 88 may be continuously connected to each other in the vehicle body front and rear direction.

Therefore, the swing door mounting structure boo for the vehicle according to an embodiment of the present invention may secure the vehicle body rigidity of the front portion and the rear portion of the upper body 1 by mounting the at least one swing door 37 on the at least one side structure 10.

The swing door mounting structure wo for the vehicle according to an embodiment of the present invention as described above may improve the connectivity, rigidity, durability, shock absorption, and NVH performance of the vehicle body configured in a one-box design while securing the mounting rigidity of the at least one swing door 37.

Although the preferred embodiments of the present invention have been described above, the present invention is not limited thereto, and various modifications and implementations are possible within the scope of the claims and the description and the accompanying drawings, and it is natural that this also falls within the scope of the present invention.

What is claimed is:

1. A swing door mounting structure for a vehicle, the structure comprising:
   a roof side reinforcement member coupled to an inner side of a cross section of a roof side of a side structure in a vehicle body front and rear direction, wherein the roof side reinforcement member has a downwardly concave cross section shape and is coupled to a lower portion of a roof side upper member to define a center closed section in the vehicle body front and rear direction; and
   a door mounting member coupled to the roof side reinforcement member to define an open cross section for mounting a swing door on the roof side.

2. The structure of claim 1, wherein the door mounting member is coupled to a lower portion of the roof side reinforcement member to define the open cross section of a '⊏' shape in a vehicle width direction and is coupled to a roof side inner panel.

3. The structure of claim 1, further comprising a center bulk head coupled to a center portion of the roof side reinforcement member.

4. The structure of claim 3, further comprising a center roof rail extending to the inner side of the cross section of the roof side and coupled to the center bulk head in a vehicle width direction.

5. The structure of claim 1, further comprising a front side reinforcement member disposed in an inner side of a cross section of a front side of the side structure and coupled to the roof side reinforcement member through a first gusset in the vehicle body front and rear direction.

6. The structure of claim 5, wherein a front closed section connected to a center closed section between the roof side upper member and the roof side reinforcement member is defined between a front side upper member and the front side reinforcement member.

7. The structure of claim 5, further comprising:
   a first front roof rail extending to the inner side of the cross section of the front side and coupled to a second gusset on the front side reinforcement member in a vehicle width direction at a position corresponding to a front pillar of the front side; and
   a second front roof rail extending to the inner side of the cross section of the front side and coupled to the first gusset in the vehicle width direction at a position corresponding to a first door support pillar of the front side.

8. The structure of claim 1, further comprising a rear side reinforcement member disposed in an inner side of a cross section of a rear side of the side structure and coupled to the roof side reinforcement member through a third gusset in the vehicle body front and rear direction.

9. The structure of claim 8, wherein a rear closed section connected to a center closed section between the roof side upper member and the roof side reinforcement member is defined between a rear side upper member and the rear side reinforcement member.

10. The structure of claim 8, further comprising:
   a first rear roof rail extending to the inner side of the cross section of the rear side and coupled to a fourth gusset in the rear side reinforcement member in a vehicle width direction at a position corresponding to a rear pillar of the rear side; and
   a second rear roof rail extending to the inner side of the cross section of the rear side and coupled to the third gusset in the vehicle width direction at a position corresponding to a second door support pillar of the rear side.

11. A swing door mounting structure for a vehicle, the structure comprising:
   a roof side reinforcement member coupled to an inner side of a cross section of a roof side of a side structure in a vehicle body front and rear direction, wherein the roof side reinforcement member has a downwardly concave cross-section shape and is coupled to a lower portion of a roof side upper member to define a center closed section in the vehicle body front and rear direction;

a door mounting member coupled to the roof side reinforcement member to define an open cross section for mounting a swing door on the roof side; and a pipe nut coupled to the roof side upper member and the roof side reinforcement member in an up and down direction in a center closed section between the roof side upper member and the roof side reinforcement member.

12. The structure of claim 11, further comprising a fastening bolt fastened to the pipe nut and to which a link arm coupled to the swing door is rotatably coupled.

13. The structure of claim 12, wherein the fastening bolt is coupled to a roof side inner panel and the door mounting member through a head portion.

14. The structure of claim 12, wherein the link arm comprises a boss portion rotatably coupled to the fastening bolt between the roof side reinforcement member and the door mounting member.

15. The structure of claim 12, wherein a reinforcement plate is coupled to the door mounting member to support a head portion of the fastening bolt.

16. A vehicle comprising:

a vehicle body comprising a side structure extending in a longitudinal direction of the vehicle body, wherein each of the side structures comprises a front side, a roof side, and a rear side;

a roof side upper member;

a roof side reinforcement member coupled to an inner side of a cross section of the roof side of the side structure in the longitudinal direction of the vehicle body, wherein the roof side reinforcement member has a downwardly concave cross-section shape and is coupled to a lower portion of the roof side upper member to define a center closed section in the longitudinal direction of the vehicle body; and a door mounting member coupled to the roof side reinforcement member to define an open cross section; and a swing door mounted to the door mounting member on the roof side.

17. The vehicle of claim 16, further comprising:

a center bulk head coupled to a center portion of the roof side reinforcement member; and a center roof rail extending to the inner side of the cross section of the roof side and coupled to the center bulk head in a vehicle width direction.

18. The vehicle of claim 16, further comprising:

a front side reinforcement member disposed in an inner side of a cross section of the front side of the side structure and coupled to the roof side reinforcement member through a first gusset in the longitudinal direction of the vehicle body;

a first front roof rail extending to the inner side of the cross section of the front side and coupled to a second gusset on the front side reinforcement member in a vehicle width direction at a position corresponding to a front pillar of the front side; and a second front roof rail extending to the inner side of the cross section of the front side and coupled to the first gusset in the vehicle width direction at a position corresponding to a first door support pillar of the front side.

19. The structure of claim 11, wherein the door mounting member is coupled to a lower portion of the roof side reinforcement member to define the open cross section of a '⊏' shape in a vehicle width direction and is coupled to a roof side inner panel.

20. The structure of claim 11, further comprising a center bulk head coupled to a center portion of the roof side reinforcement member.

* * * * *